Patented Jan. 30, 1934

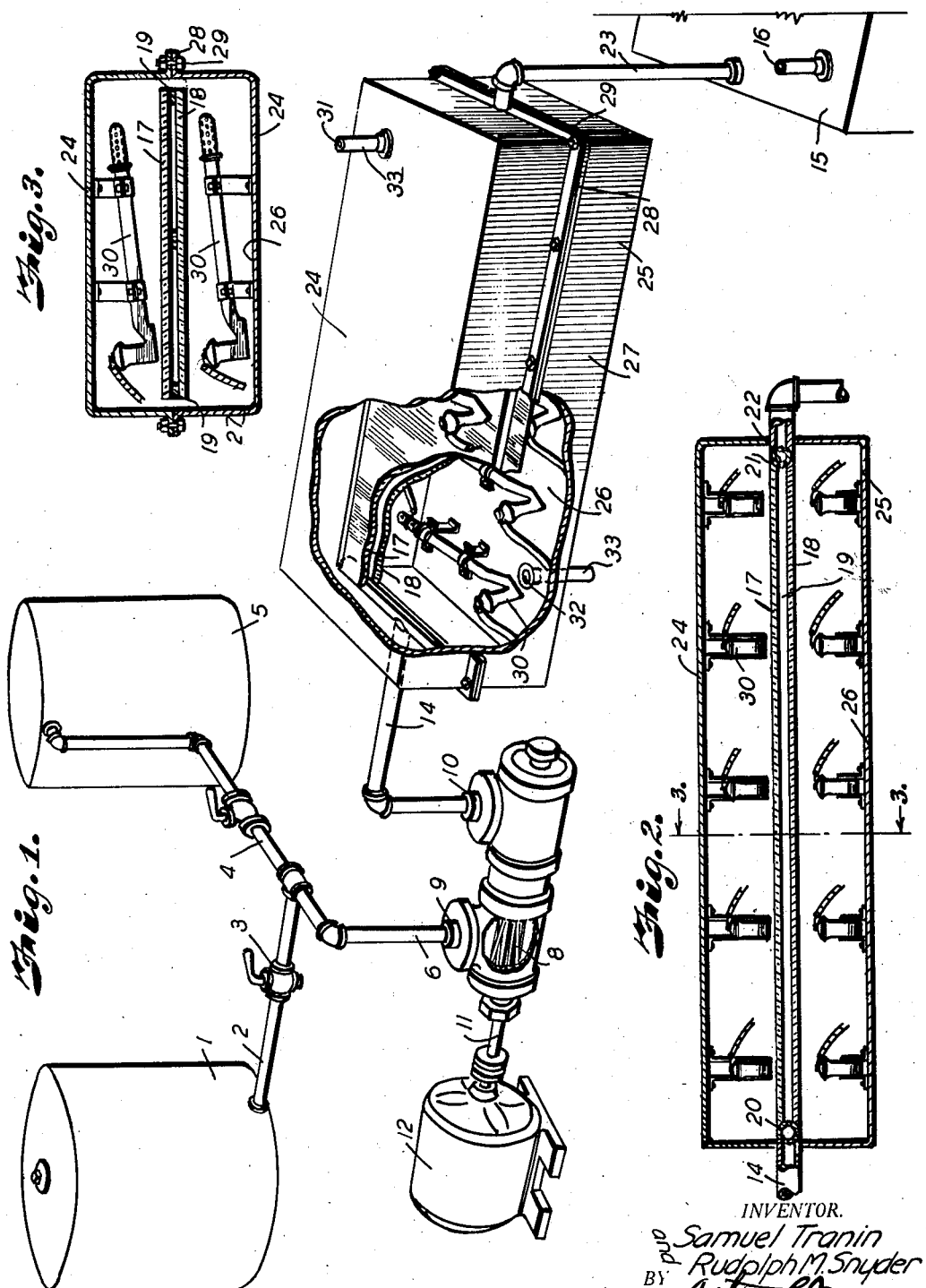

1,945,102

UNITED STATES PATENT OFFICE 1,945,102

METHOD OF TREATING FOOD PRODUCTS

Samuel Tranin and Rudolph M. Snyder, Kansas City, Mo.; said Snyder assignor to said Tranin Application August 18, 1930. Serial No. 476,023

3 Claims. (Cl. 99—15)

Our invention relates to a method of treating substances such as foods normally supporting microorganisms, to reduce the activity of such organisms.

It is well known that spoilage of foods is largely due to multiplication of relatively harmless or pathogenic microorganisms present either in or on the food in its natural state or becoming associated with the food accidentally. The most common method of reducing the effect of microorganisms on a food product is to heat the product sufficiently to destroy a substantial proportion of the organisms or render them innocuous, whereby the spoilage of the food may be delayed. The application of sufficient heat to effect partial or total sterilization usually results in substantially changing the quality or character of the food treated, and the heating method is therefore not applicable to many foods which are preferably supplied in their natural state, for cooking or for consumption raw.

Fluid germicidal agents have sometimes been employed for purifying solid and liquid bodies, as in the case of chlorine gas used to purify a water supply, but have not been suggested for sterilizing foods into which the agents might penetrate, so far as we are aware because of the probability that the foods would retain sufficient traces of the germicidal agents to produce unpleasant or harmful effects.

The principal objects of our invention therefore, are to reduce the deleterious effect of bacteria on food and like products without deleteriously affecting the natural qualities of the products, to employ fluid and/or radiant germicidal agents in such a manner as to effect destruction of a substantial proportion of microorganisms associated with a food product and to separate the fluid agent from the food product.

More particularly our invention consists in applying a fluid germicidal agent to a translucent food product to destroy a substantial proportion of microorganisms associated with the product, passing the product and portions of the agent associated therewith in a relatively thin stream between lamps emitting ultra violet rays to effect destruction of organisms not acted on by the fluid agent and stimulate the activity of vitamines, heating the moving stream to promote rapid evaporation of the fluid agent, and effecting removal of vapors without exposing the food to air.

In accomplishing these and other objects of our invention, we have provided improved details of structure, the preferred form of which is illustrated in the accompanying drawing, wherein:

Fig. 1 is a perspective view of apparatus for carrying out our invention, a receiving tank being shown fragmentarily.

Fig. 2 is a longitudinal vertical section through the unit for applying ultra violet rays and heat to the food product being treated, inlet and outlet pipes being shown fragmentarily.

Fig. 3 is a cross section through the ray treating unit.

Referring in detail to the drawing:

1 designates a storage or supply container for food to be treated, representing in the illustrated use of the invention a tank or reservoir for a body of liquid, 2 a pipe leading from the food supply tank having a valve 3, 4 a valved pipe leading from a supply tank 5 for a fluid treating agent, and 6 a conduit connected to the pipes 2 and 4, whereby the treating agent may be delivered into the stream of food to mingle therewith for destroying microorganisms carried by the stream.

The food being treated may consist of liquid egg, milk or like food article adapted to flow, and the invention will be particularly described as applied to the treatment of liquid egg. In such case, the treating agent consists of a germicidal gas or volatile liquid or solid harmless to foods in the amounts used, such as hydrogen peroxide, ozone, and halogens, including chlorine, bromine, and iodine, which can be made to permeate the body of liquid egg and bubble therethrough.

The gas may be diluted with an inert gas, and any desired combination of gases adapted to effect the results described may be provided in the tank 5 to be moved by suitable means such as pressure of gas compressed in the tank to the conduit.

In order to assure thorough mixture of the fluid treating agent with the food, we preferably interpose a mixer 8 in the conduit 6 comprising a hollow cylindrical body having upwardly directed inlet and outlet bosses 9 and 10 at opposite ends, and provided with blades on the shaft 11 of a motor 12. The mixer thus comprises a pump for agitating the food to form a homogeneous body and to stir the gas and food to promote germicidal effect of the gas.

The mixture of food and gas passes from the pump cylinder through a conduit portion 14 toward a receiving tank 15 sealed to prevent access of air to the treated food, and having a vent 16 to permit escape of substantially all of the gas. The temperature of the mixture is increased slightly while passing to the tank 15 to promote removal of the gas from the food, preferably as presently described.

Interposed in the conduit leading from the pump is a unit for applying radiant treatment, including a channel member comprising narrowly spaced panes or plates 17 and 18 of material adapted to permit passage of ultra-violet rays, side walls 19 formed of similar material, and end walls 20 and 21 preferably consisting of headers having longitudinal openings such as slots 22 and connected respectively with the conduit portion 14 and a conduit portion 23 leading to the receiving tank 15.

The channel member is preferably formed of pieces of translucent quartz having abutting edges sealingly joined by suitable means such as cement.

Surrounding the channel member is a frame including pan-like supports 24 and 25 comprising bottom plates 26 and side walls 27 having flanges 28 connected by bolts 29 to form a chamber, and provided with lamps 30 suitably connected with a source of electrical energy, and adapted to emit ultra-violet rays to destroy bacteria in the stream of fluid passing through the shallow channel.

The lamps are supported in close proximity to the quartz plates, and the pans extend laterally beyond the side edges of the plates to locate portions of the lamps in suitable position for movement of rays angularly from the lamps through the side walls of the channel member, thus assuring maximum effect of the rays on the stream of food.

Control of the temperature of the food is further provided for, to promote escape of the gas and also to avoid overheating the food. Heat is preferably applied to the food at some point after the mixture of the fluid treating agent therewith, and the heat resulting from the operation of the violet ray lamps is preferably employed for this purpose, the depth of the pan-like lamp housing members being adjusted to locate the lamps sufficiently close to the quartz plates to heat the same.

The frame-like lamp supports will ordinarily be mounted on a bench, and will support the channel member due to location of the header-engaged portions of the conduits 14 and 23 in end apertures in the frame, as illustrated in Fig. 1.

The housing members are preferably formed of material opaque to ultra-violet rays and also adapted to reflect rays toward the quartz plates, and are provided with ports 31 and 32 equipped with nipples 33 to receive tubes or the like for circulating a temperature-modifying medium in the housing around the channel member, to increase or lower the temperature, for example for ventilating the housing and circulating air to cool the channel member.

In using the invention to treat fluid substances such as foods in liquid form, the germicidal fluid is introduced into a stream of the food, and thoroughly distributed therethrough by the mixer. The mixture passes through the quartz channel member, and receives the ultraviolet rays, incidentally being heated, and the temperature being controlled to prevent overheating of the food. The mixture is delivered to a receiving reservoir closed to prevent contamination of the food, and substantially all of the agent escapes in vapor through the vent of the reservoir.

The agent used, for example chlorine gas in small amounts, has substantially no chemical effect on the food, but is kept in association with the food long enough while moving through the mixer and the channel member, and while retained in the reservoir, to obtain a maximum effect for the proportional amount of chlorine used.

Extremely small amounts of the germicidal gas may be introduced continuously into a stream of liquid food, and amounts comparable to those used in purifying water may be employed, whereby sufficient gas will be added to destroy a substantial proportion of bacteria.

Should the chlorine be delivered to the stream of food in amounts insufficient to completely sterilize the food, the ultra-violet rays will destroy substantially all of the bacteria unaffected by the chlorine.

The maintenance of a temperature approximately 100° F. in the lamp housing will assure vaporization of substantially all the dissolved chlorine, even though an excessive proportion of chlorine be introduced. The several elements thus cooperate to assure destruction of substantially all the bacteria carried by the food, and to substantially eliminate the chlorine, the radiant element and temperature control means compensating for any deficiency or excess of chlorine. The relatively slow action of ultra violet rays for purification is compensated for by the use of the chlorine.

What we claim and desire to secure by Letters Patent is:

1. The method of treating foods including introducing chlorine gas to a stream of liquid food to destroy bacteria therein, and passing said food in a continued stream closely adjacent a violet ray lamp to cause rays from the lamp to penetrate said stream, and permit the heat normally produced incidentally to production of said rays to evaporate the gas.

2. In a method of treating liquid food products wherein ultraviolet rays are employed for radiant treatment of the foods, the steps of mixing a volatile germicide with a stream of food, and passing the food in a continued stream sufficiently close to the source of rays to enable the source of rays to heat the body for vaporizing the germicide.

3. In a method of treating liquid foods including discharging ultraviolet rays from a source evolving heat for treating the foods with the rays, the steps of confining a continuously flowing stream of food to movement across the paths of the rays, mixing a fluid treating agent with the food for movement therewith across the paths of the rays, locating the path of the stream sufficiently close to the source of rays to enable evolving heat to heat the fluid agent for removing said agent from the food by evaporation, and controlling the effect of evolved heat on the stream to avoid over-heating the food.

SAMUEL TRANIN.
RUDOLPH M. SNYDER.